Aug. 18, 1942.        J. W. LESLIE        2,293,509
BALE BAND
Filed Sept. 7, 1940
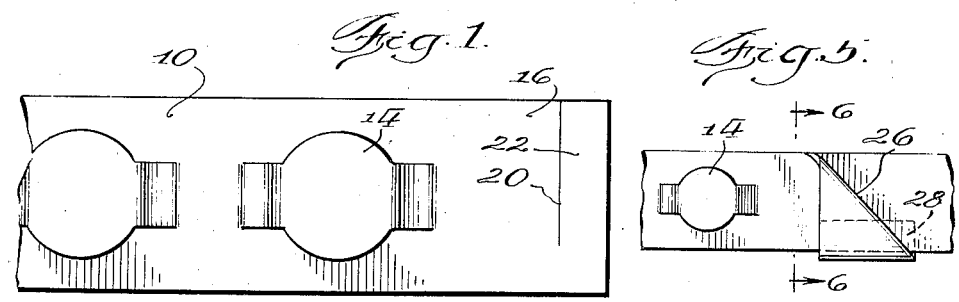
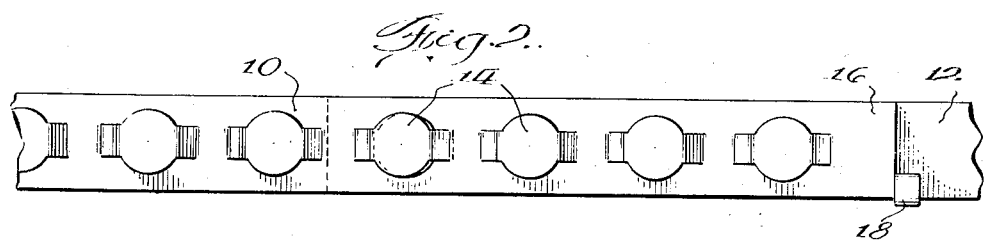
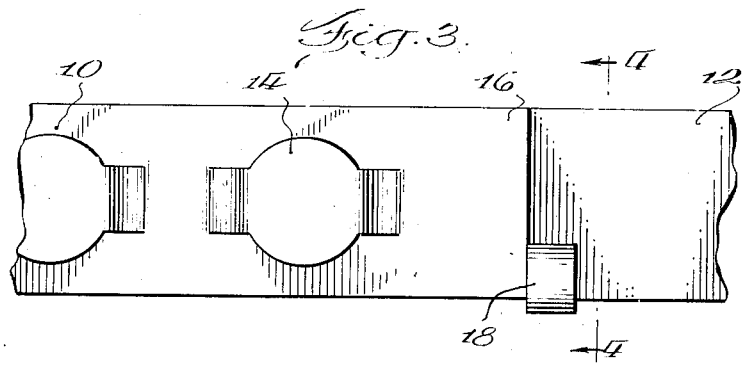
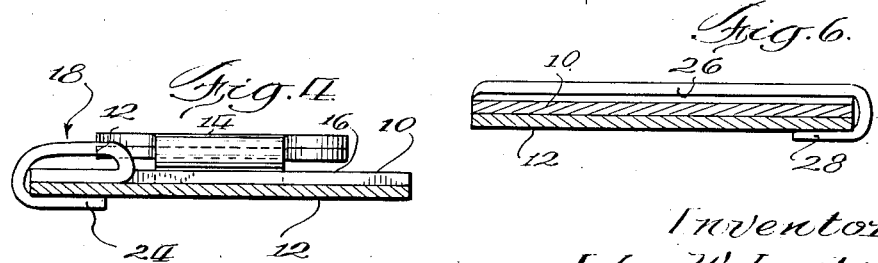
Inventor:
John W. Leslie
By Williams, Bradbury & Hinkle
Attys.

Patented Aug. 18, 1942

2,293,509

UNITED STATES PATENT OFFICE 2,293,509

BALE BAND

John W. Leslie, Chicago, Ill., assignor to Signode Steel Strapping Company, Chicago, Ill., a corporation of Delaware Application September 7, 1940, Serial No. 355,731

4 Claims. (Cl. 24—20)

This invention relates to bale bands.

More particularly the invention is concerned with the provision of precut and preformed bale bands with clamping means to retain the overlying free end of the bale band.

Bale bands of the type to which this invention relates consist of lengths of steel strap intended to be used to confine compressed bales, boxes or other packages for shipment and the ends of which are provided with interengaging elements to be connected by the baler. In applying these bale bands, the bale or other article to be bound is compressed and encircled by a band and the overlapped ends of the band secured together by manual engagement of the interengaging elements. In practice, it is usually found that in the formation of bales or other packages intended to be all of the same size, some of these bales or packages will be somewhat smaller than others. For this reason, bale bands of the type to which this invention particularly applies are provided at each end with several engaging elements any one of which can be engaged with complementary elements at the other end of the band. Thus, one size of bale band can be used for bales or packages of varying sizes. However, when used with the smaller packages, the free end of the overlying band portion extending beyond the joint will be of considerable length. This comparatively long free end is easily bent outwardly where it may catch in other bales and packages and otherwise constitute a hazard.

It is, therefore, an object of my invention to provide simple means for fixing the outer end of the overlying strap portion of a bale band to the contiguous underlying band portion to prevent the deflecting of the overlying free end outwardly where it may form a hazard.

An additional object of my invention is to provide a novel specially formed bale band that enables the baler quickly and easily to fix the overlying free end to the contiguous underlying portion of the bale band without the use of any tools.

Other objects and advantages will appear from the following description, reference being had to the accompanying drawing, in which:

Fig. 1 is an enlarged plan view of a bale band end portion showing the end fixing means in one stage in its formation;

Fig. 2 is a plan view of overlapped bale band portions, showing the bale band joint and the free end securing means;

Fig. 3 is an enlarged plan view of the free end securing means shown in Fig. 2;

Fig. 4 is a vertical transverse sectional view through the underlying bale band portion, showing the free end portion and securing means in end elevation, and is taken in the direction of the arrows along the line 4—4 of Fig. 3.

Fig. 5 is a plan view similar to Fig. 2, but showing an alternative embodiment of my invention, and Fig. 6 is a vertical transverse sectional view through the underlying bale band portion of the embodiment shown in Fig. 5 illustrating the free end portion and securing means in end elevation.

Referring to the drawing, the bale band which comprises a precut and preformed length of steel strap is placed about the compressed bale or other package, with one end 10 overlapping the other end 12. These two ends are then gripped manually and selected joint elements engaged to prevent separation of the band ends when the compressing force is released. The particular joint indicated at 14 is the subject of a separate application and is shown here merely as being illustrative of any of a wide variety of joints used for securing together overlapped bale band ends.

If the bale or other package thus bound is somewhat smaller than the largest size with which the particular band is adapted to be used, the overlying band portion 10 will extend for a considerable distance beyond the joint at 14. Thus, a free end 16 is formed which I secure against the underlying band portion 12 by means of a clamp 18.

This clamp is formed from the stock of the band by shearing the end that is to be the overlying portion 10 transversely at 20 inwardly from one end of the band almost to the other edge. This provides a narrow strip 22 extending transversely and contiguous to the end of the strap body, and attached to the end of the band for a short distance along one end of its contiguous edge. This strip 22 is folded back upon itself, over the edge of the band and then underneath the lower surface thereof to provide a finger 24 substantially parallel to the plane of the band and spaced below the lower surface of the band a distance substantially equal to the strap thickness.

As an alternative embodiment of my invention, see Figs. 5 and 6, the free end of the band is bent upwardly and over upon itself along a line 26 extending at an angle of about 45° to the center line of the strap. This bent end portion is pressed into close face to face relationship with the top surface of the band and its extreme end is then bent downwardly along the edge of the band and underneath the band to form a finger 28 positioned substantially parallel to the band body and spaced from the lower surface thereof a distance substantially equal to the band thickness.

In using either of these bale bands the baler slips the edge of the underlying band portion between the lower surface of the overlying band portion and the finger 24 or 28 as the case may be at the time the band is applied to the package and the interengaging elements selectively engaged. Thereafter the free end of the overlying band portion will be firmly retained against the underlying band portion and will thus be prevented from projecting outwardly and forming a hazard.

Having described my invention, what I claim as new and useful and desire to secure by Letters Patent of the United States is:

1. A clamp for retaining the loose end of a flat metallic bale band of the type having interlocking strap deformations for uniting the overlapping strap ends when the band is in position, characterized by the fact that the tip of the loose band end is deformed to form a clamping member which passes around the edge of and beneath the portion of the band opposite the loose band end to engage the under surface of said band portion and retain the loose band end to the band when the band is in position.

2. In a preformed bale band adapted for embracing bales or packages of varying circumference, wherein the underlying end of the bale band can be attached to the overlying portion at any one of several intermediate points, thereby leaving a free end of variable length of the overlying end extending beyond the point of attachment; a means for insuring that the said free end lies closely against the underlying band portion, comprising a bent portion arranged at the said free end to provide a finger arranged generally parallel to the adjacent portion of the band at the free end and spaced below the principal portion of the band a distance substantially equal to the band thickness, said finger being connected at one end to the principal portion of the band and having its opposite end free, the length of said finger being less than the width of the band, whereby said finger can be slid beneath the underlying band portion by a relative transverse movement between the said free end and the underlying band portion after the free end of the overlying band portion has been brought into face to face contact with the underlying band portion with the free end of the overlying band portion offset from the underlying band portion a distance at least equal to the length of said finger.

3. A bale band of such length that the ends thereof overlap when the band is in position, a fastening for affixing the end of the underlying portion of the band to an intermediate point of the overlying portion thereof to prevent relative longitudinal movement therebetween, a finger formed integrally with the free end of the overlying band portion and joined thereto by a diagonal fold, said finger extending downwardly past the edge of the overlying band portion and then inwardly to a position generally parallel to the overlying band portion and spaced therebeneath a distance substantially equal to the band thickness, said finger being adapted to engage the under surface of the underlying band portion to prevent movement of the free end of the overlying band portion in a direction normal to the plane of the underlying band portion, the portion of said finger which extends inwardly having a length less than the width of the bale band.

4. A bale band as called for in claim 3 and in which the finger has a curved portion near its fixed end which extends from beneath the bale band, around one edge of the bale band and is formed integrally with a short extension projecting beyond the end of the band proper, said projection being located at one edge of the band end, and the developed length of the finger plus the width of said extension being substantially equal to the width of the bale band.

JOHN W. LESLIE.